United States Patent [19]

Otake et al.

[11] Patent Number: 5,509,663
[45] Date of Patent: Apr. 23, 1996

[54] IMAGE PROCESSING APPARATUS AND EXTERNAL STORAGE UNIT

[75] Inventors: Masahiro Otake, Kyoto; Toyofumi Takahashi, Tokyo; Satoshi Nishiumi, Kyoto; Kumiko Kitagawa, Tokyo, all of Japan

[73] Assignees: Nintendo Co., Ltd., Kyoto; Ricoh Co., Ltd., Tokyo, both of Japan

[21] Appl. No.: 792,207

[22] Filed: Nov. 13, 1991

[30] Foreign Application Priority Data

Nov. 17, 1990 [JP] Japan ................... 2-312409

[51] Int. Cl.$^6$ ........................................ A63F 9/22
[52] U.S. Cl. ................. 273/437; 345/113; 345/153; 395/131; 395/135
[58] Field of Search ................... 358/22; 273/433, 273/434, 437, DIG. 28; 340/703, 720, 721, 729, 732, 734; 395/100, 122, 118, 129, 130, 131, 132, 133, 135, 152; 345/120, 121, 122, 114, 115, 113, 153

[56] References Cited

U.S. PATENT DOCUMENTS

| | | | |
|---|---|---|---|
| 4,149,184 | 4/1979 | Giddings et al. | |
| 4,481,529 | 11/1984 | Kerling | 273/437 |
| 4,528,636 | 7/1985 | Robinson, III | 395/129 |
| 4,752,893 | 6/1988 | Guttag et al. | 395/129 |
| 4,824,106 | 4/1989 | Ueda et al. | |
| 4,874,164 | 10/1989 | Miner et al. | 273/437 |
| 4,901,251 | 2/1990 | Sfarti | 395/129 |
| 4,918,625 | 4/1990 | Yan | 395/131 |
| 4,933,878 | 6/1990 | Guttag et al. | 364/521 |
| 4,970,636 | 11/1990 | Snodgrass | 340/723 |
| 4,982,343 | 1/1991 | Hourvitz et al. | 364/521 |
| 4,992,780 | 2/1991 | Penna et al. | 395/122 |
| 5,142,616 | 8/1992 | Kellas et al. | 395/135 |
| 5,142,621 | 8/1992 | Guttag et al. | 395/164 |
| 5,162,784 | 11/1992 | Guttag et al. | 340/724 |
| 5,307,452 | 4/1994 | Hahn et al. | 395/132 |

FOREIGN PATENT DOCUMENTS 0160549  11/1985  European Pat. Off. .

Primary Examiner—Jessica J. Harrison
Attorney, Agent, or Firm—Nixon & Vanderhye

[57] ABSTRACT

An image processing apparatus includes a CPU which executes a program read from an external storage unit, and a video processor. In the video processor, color data of moving picture characters and color data of still picture characters are respectively outputted from a moving picture data generating circuit and a still picture data generating circuit. Both the color data are applied to a main/subsidiary data selection circuit which outputs the color data as main image data and subsidiary image data. An arithmetic circuit executes an arithmetic operation to obtain a mean value of both the color data. A video signal producing circuit converts the mean value of the color data from the arithmetic circuit into a video signal which is then applied to a display.

19 Claims, 13 Drawing Sheets

F I G. 10
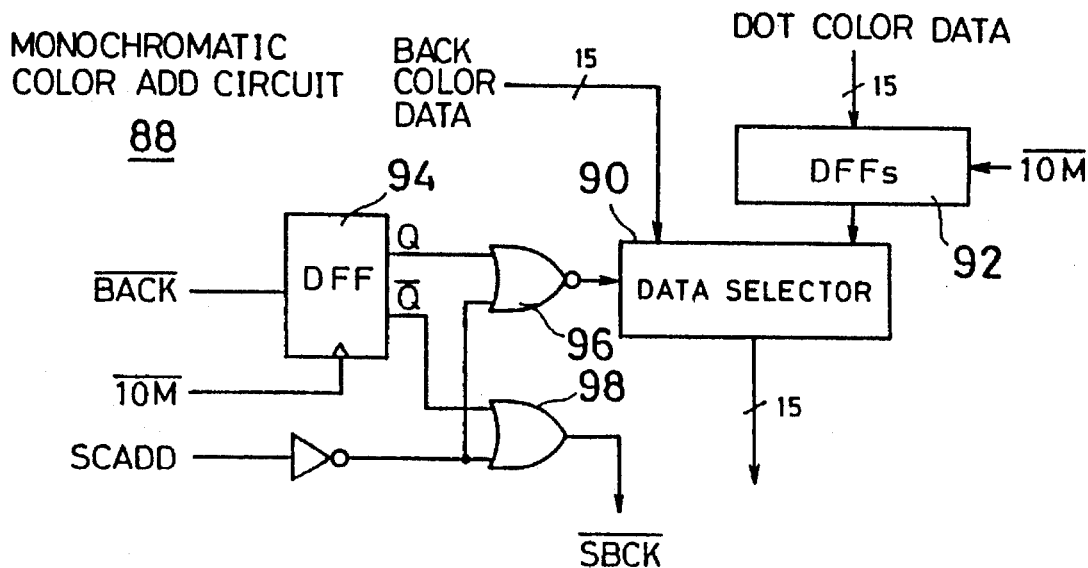
F I G. 18
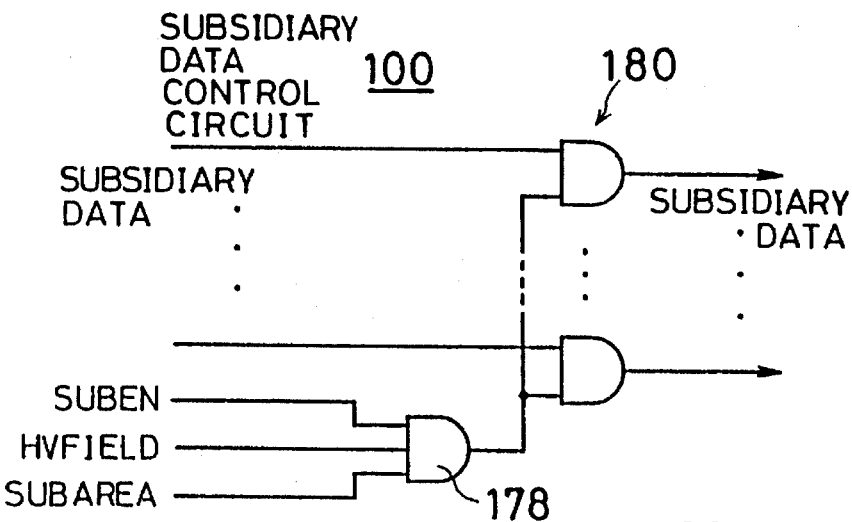
F I G. 19
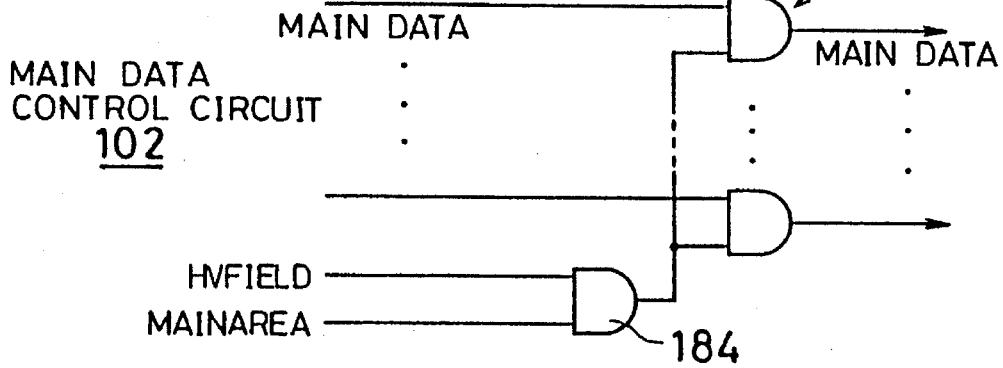

F I G. 12A
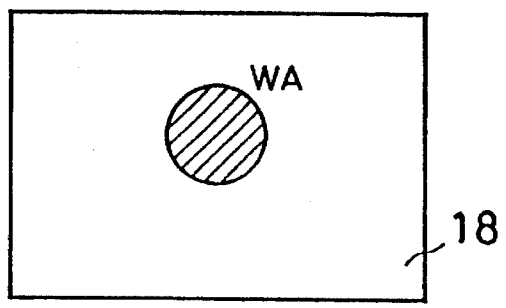
WAEN = 1
WAIO = 1
WBEN   0
F I G. 12B
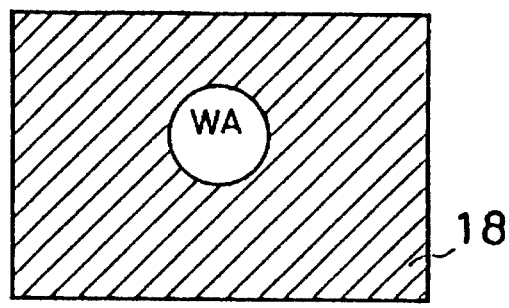
WAEN = 1
WAIO = 1
WBEN = 0
F I G. 13A
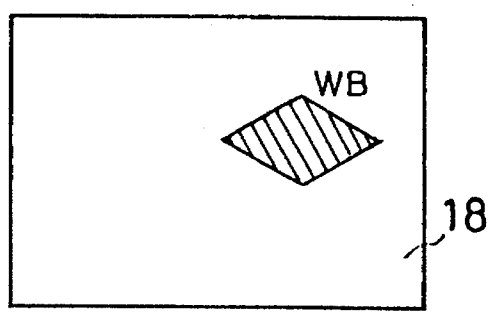
WBEN = 1
WBIO = 1
WAEN = 0
F I G. 13B
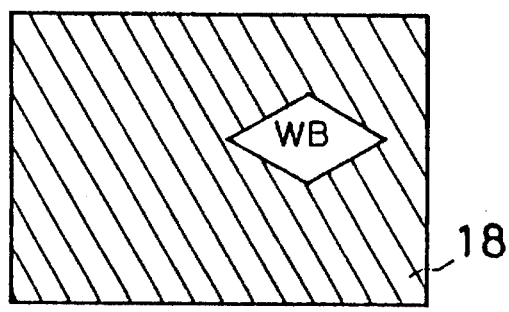
WBEN = 1
WBIO = 0
WAEN = 0
F I G. 14
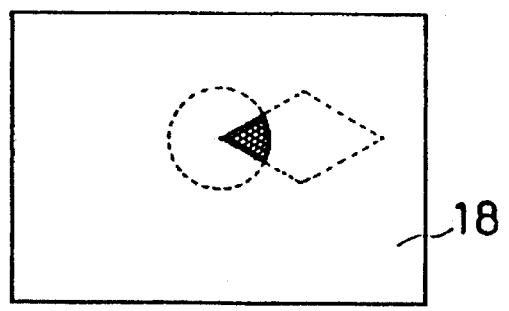
WAEN = WBEN = 1
WLS1 = WLS2 = 0

WAEN = WBEN = 1
WLS1 = 0  WLS2 = 1

WAEN = WBEN = 1
WLS1 = WLS2 = 1

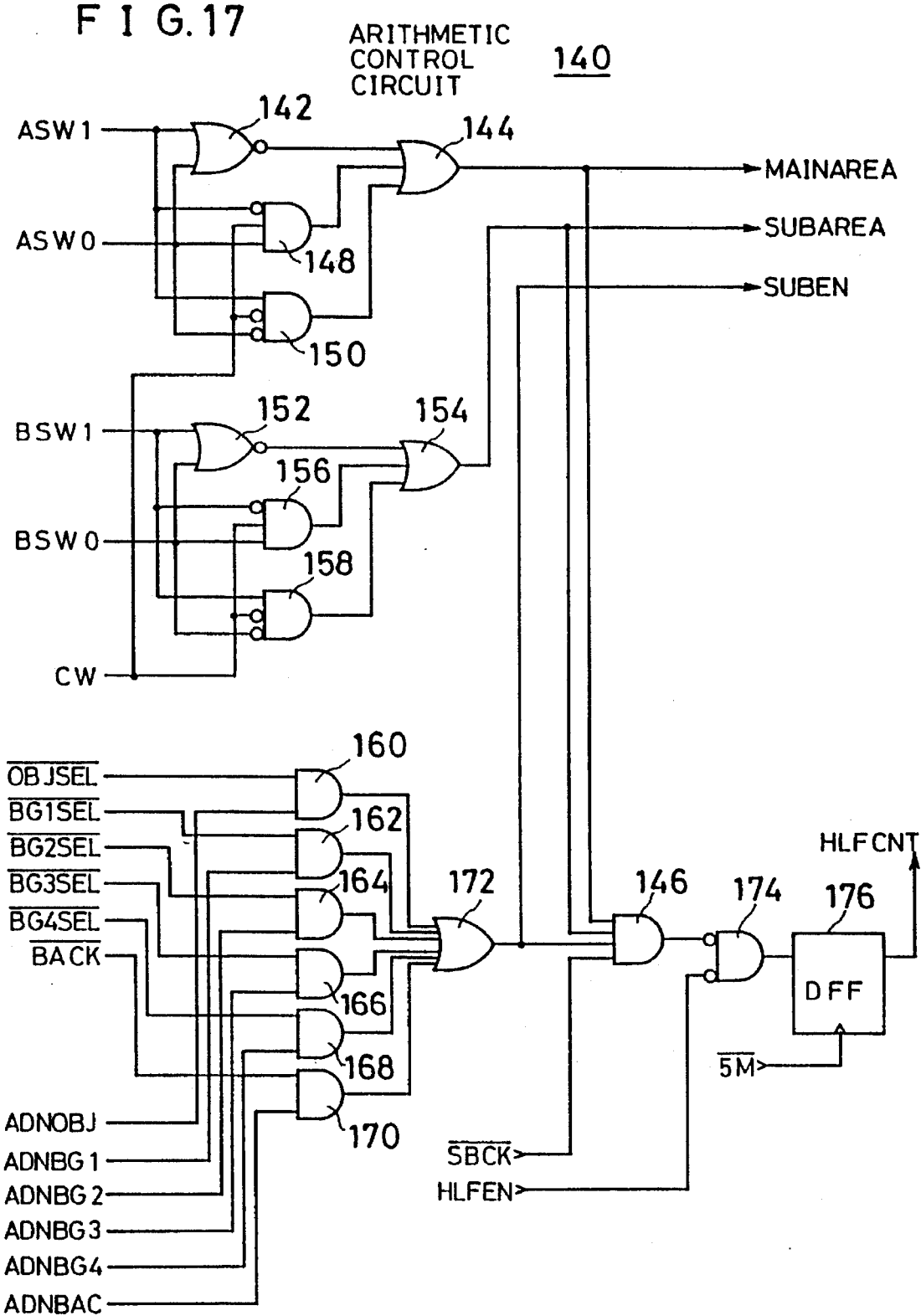

IMAGE PROCESSING APPARATUS AND EXTERNAL STORAGE UNIT

BACKGROUND OF THE INVENTION

1. Field of the Invention

The present invention relates to an image processing apparatus and an external storage unit used therein. More particularly, the present invention relates to an image processing apparatus intended for application to a television game apparatus and capable of displaying a color image on a screen of a display according to color data for each dot.

2. Description of the Prior Art

One example of an image processing apparatus of this kind is disclosed in Japanese Patent Laid-open (Kokai) Sho 59-118184 laid open on Jul. 7, 1984 (corresponding to U.S. Pat. No. 4,824,106 issued on Apr. 25, 1989). This prior art image processing apparatus displays a color image by combining a moving picture (objects) and a background picture (still images) on a screen of a raster scan monitor. Priorities are assigned respectively to the moving picture and the still picture, and only the moving picture or the still picture having a higher priority can be displayed in an area in which the moving picture and the still picture are superposed. In such a case, since the moving picture or the still picture having a lower priority is not displayed, it was impossible to display a state where two pictures are overlapped or a picture of a transparent object such as glass.

The foregoing prior art image processing apparatus may be able to display a moving picture and a background picture apparently overlapping each other by displaying the moving picture in every other frame of the raster scan monitor. However, even this displaying method has been unable to display a transparent object.

It is possible to display a transparent object if the image processing apparatus is provided with a memory for storing modified color data representing a superposed image of a moving picture and a still picture separately from original color data. In a computer graphic technology, it is possible to employ this method that stores additional color data beforehand because there is no restriction on a storage capacity. However, a television game apparatus must be inexpensive and hence its storage capacity is limited. Therefore, it is impossible to apply the computer graphic technology to the television game apparatus.

SUMMARY OF THE INVENTION

Therefore, it is a principal object of the present invention to provide an image processing apparatus capable of a display state including a plurality of images.

Another object of the present invention is to provide an image processing apparatus capable of displaying a transparent object.

Briefly, the present invention provides an image processing apparatus capable of displaying a color image on a display according to color data of each dot, comprising first image data generating means for generating first color data of a first image, second image data generating means for generating second color data of a second image for each dot, arithmetic means for executing a predetermined arithmetic operation by using the first color data and the second color data, and video signal generating means for converting output data from the arithmetic means into a video signal to apply the same to the display.

The first color data and the second color data generated respectively by the first image data generating means and the second image data generating means are applied to the arithmetic means, and then the arithmetic means calculates, for example, a mean value of the first color data and the second color data to provide color data representing a superposed state of the first image and the second image. The video signal generating means receives the color data, generates RGB signals or a composite video signal on the basis of the color data, and then gives the RGB signals or the composite video signal to the display such as a raster scan monitor. Consequently, the first and second images are displayed in a composite color on the screen of the raster scan monitor.

In accordance with the present invention, it is possible to display a superposed state of a plurality of images with simple structure. Thus, the image processing apparatus is capable of displaying a transparent object, such as glassware. The image processing apparatus in accordance with the present invention is able to display a transparent object without requiring increase of a storage capacity because any color data representing a superposed image need not be stored beforehand in a memory. Thus, the image processing apparatus in accordance with the present invention is particularly suitable for use as a television game apparatus.

In an embodiment, an external storage unit which is used in an image processing apparatus includes character data storing means for storing character data of moving picture characters and still picture characters; and color arithmetic program storing means for storing color arithmetic program according to which a color arithmetic operation can be executed. The first color data generating means and second color data generating means generates respectively the first color data of the first image and the second color data of the second image data on the basis of the character data read from the external storage unit. The arithmetic means executes an arithmetic operation determined by the arithmetic program read from the external storage unit by using the first color data and the second color data.

In addition, the arithmetic means includes a plurality of arithmetic functions, and the color arithmetic program includes data for specifying one of the plurality of arithmetic functions. Therefore, the arithmetic means executes an arithmetic operation according to an arithmetic function specified by the arithmetic function specifying data.

In addition, the color arithmetic program includes range data program for generating data specifying a range on a screen of said display, and the arithmetic means executes an arithmetic operation in the range specified by said range data.

Furthermore, the color arithmetic program includes monochromatic color data program for generating monochromatic color data that specifies a color of a whole screen of the display as a monochromatic color, and the arithmetic means executes an arithmetic operation by using at least one of the first color data and the second color data., and the monochromatic color data generated based on the monochromatic color data.

The objects and other objects, features, aspects and advantages of the present invention will become more apparent from the following detailed description of the embodiments of the present invention when taken in conjunction with accompanying drawings.

BRIEF DESCRIPTION OF THE DRAWINGS

FIG. 10 is a block diagram showing a monochromatic color add circuit in FIG. 1 embodiment;

FIGS. 12A and 12B are illustrative views showing a screen of a raster scan monitor in a state where an inside of a first window is enabled and in a state where an outside of the first window is enabled, respectively;

FIGS. 13A and 13B are illustrative views showing the screen of the raster scan monitor in a state where an inside of a second window is enabled and in a state where an outside of the second window is enabled, respectively;

FIG. 14 is an illustrative view showing the screen of the raster scan monitor in a state where both the first and second windows are enabled in an AND manner;

FIG. 17 is a block diagram showing an operation control circuit in FIG. 1 embodiment;

FIG. 18 is a block diagram showing a subsidiary data control circuit in FIG. 1 embodiment;

FIG. 19 is a block diagram showing a main data control circuit in FIG. 1 embodiment.

DETAILED DESCRIPTION OF THE PREFERRED EMBODIMENTS

Figure 1:
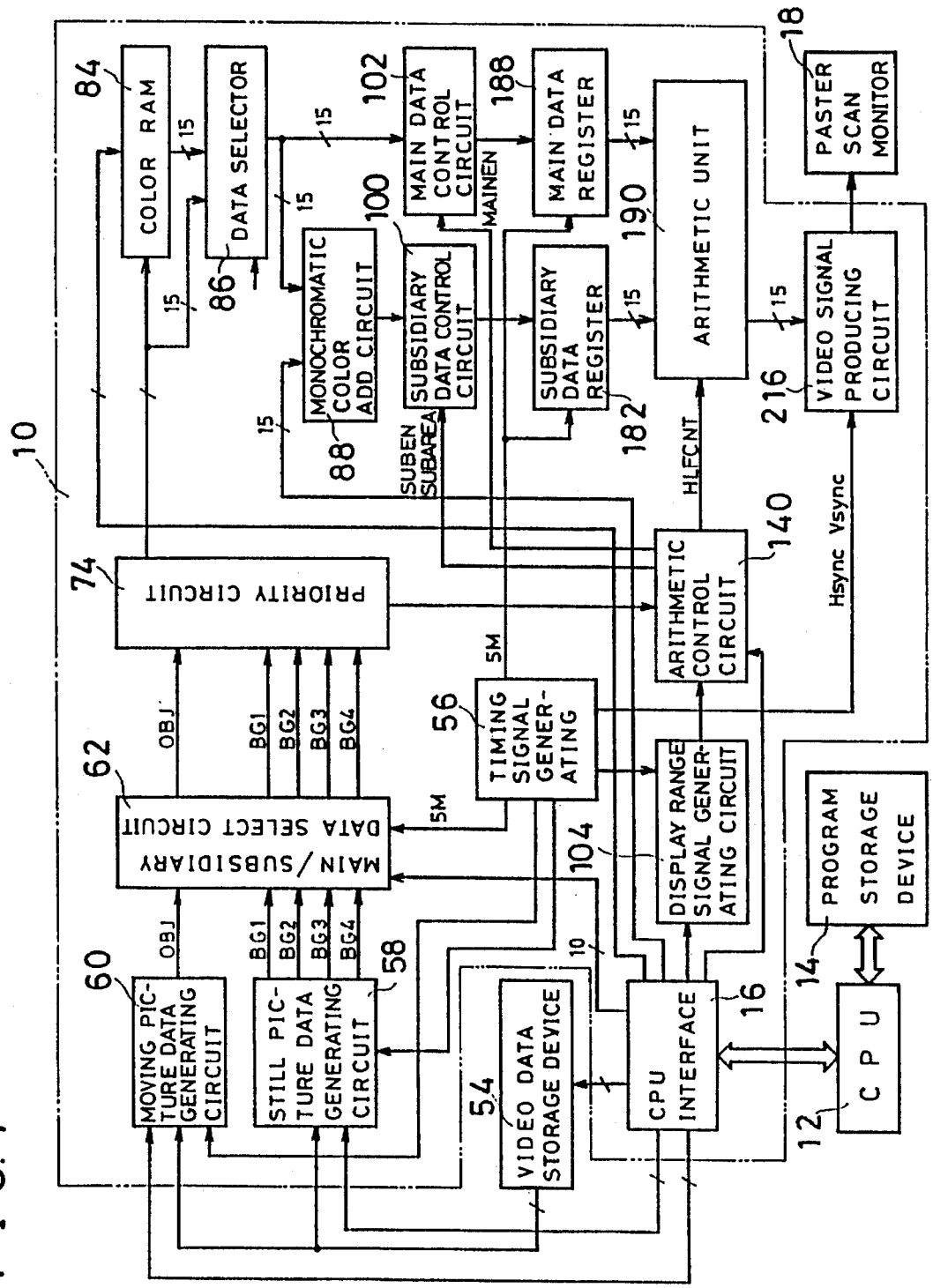
FIG. 1 is a block diagram showing one embodiment according to the present invention.

Referring to FIG. 1, a video processor 10 in this embodiment shown is coupled to a CPU 12. The CPU 12 operates according to program data stored in a program storage device 14 such as a detachable memory cartridge to apply necessary signals and data through a CPU interface 16 which is included in the video processor 10 to components (described later) of the video processor 10 so that an image can be displayed on a screen of a raster scan monitor 18 according to the program. The CPU 12 may be, for example, a 16-bit microprocessor.

Figure 2:
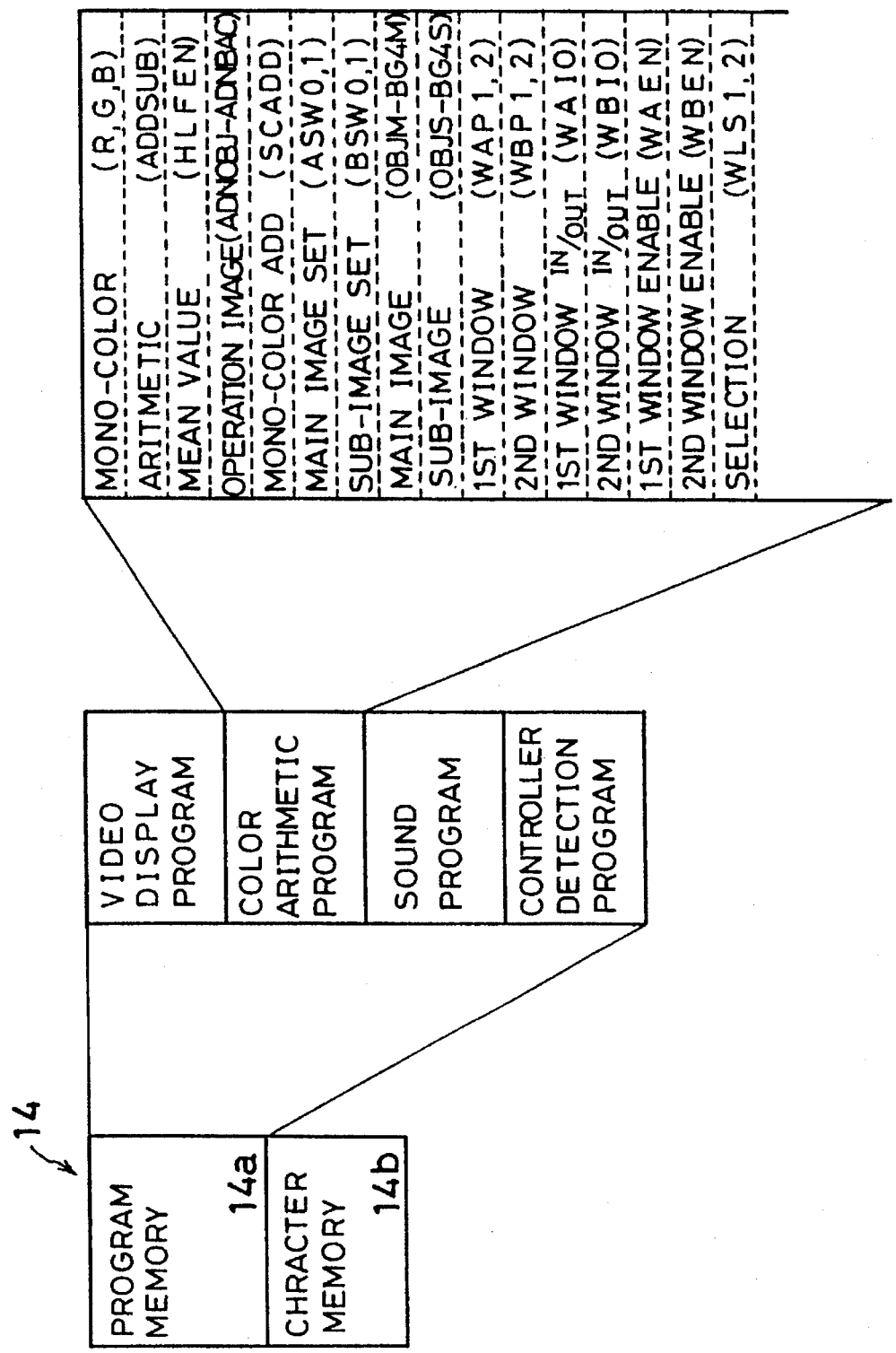
FIG. 2 is an illustrative view showing one example of program data to be stored beforehand in a program storage device included in FIG. 1 embodiment.

The program storage device 14 which is a detachable memory cartridge as described above includes a memory which stores program data necessary for executing a game, and character data of moving picture characters and still picture characters for the game. As shown in FIG. 2, the program data is stored in a program memory 14a which is typically constructed by a ROM, and the character data is stored in a character memory 14b which is typically constructed by a RAM. A color arithmetic program is stored, in addition the program necessary for executing the game, in the program memory 14a. The color arithmetic program includes monochromatic color data R, G and B, arithmetic specifying data ADDSUB, mean value specifying data HLFEN, operation image specifying data ADNOBJ-ADNBAC, a monochromatic color add enable signal SCADD, main image set data ASW0 and ASW1, subsidiary image set data BSW0 and BSW1, main image specifying data OBJM-BG4M, subsidiary image specifying data OBJS-BG4S, first window set data WAP1 and WAP2, second window set data WBP1 and WBP2, first window inside/outside specifying data WAI0, second window inside/outside specifying data WBI0, a first window enable signal WAEN, a second window enable signal WBEN, select data WLS1 and WLS2 and etc.

The monochromatic color data R, G or B is 5-bit data indicating the gradation of the color in coloring the background in red, blue or green when none of moving pictures OBJ and first to fourth still picture BG1 to BG4 are displayed. The arithmetic operation specifying data ADDSUB is 1-bit data specifying addition or subtraction for an arithmetic unit which will be described later. The mean value specifying data HLFEN is 1-bit data specifying whether or not the mean value is to be calculated by the arithmetic unit. The operation image specifying data ADNOBJ-ADNBAC represents augend data to which the subsidiary image data is to be added, which includes specifying data ADBOBJ, ADNBG1, ADNBG2, ADNBG3, ADNBG4 and ADNBAC each of which is one bit. The operation image specifying data ADNBAC indicates the color of the background. The monochromatic color add enable signal SCADD is 1-bit data specifying whether or not the above described background color is to be added. Each of the main image set data ASW0 and ASW1 is 1-bit data to be given to a main data control circuit (described later). Each of the subsidiary image set data BSW0 and BSW1 is 1-bit data to be given to a subsidiary data control circuit (described later). The main image specifying data OBJM-BG4M is data specifying which one is specified as a main image, which includes specifying data OBJM, BG1M, BG2M, BG3M and BG4M each of which is one bit. The subsidiary image specifying data OBJS-BG4S is data specifying which one is specified as a subsidiary image, which includes specifying data OBJS, BG1S, BG2S, BG3S and BG4S each of which is one bit.

Figure 3:
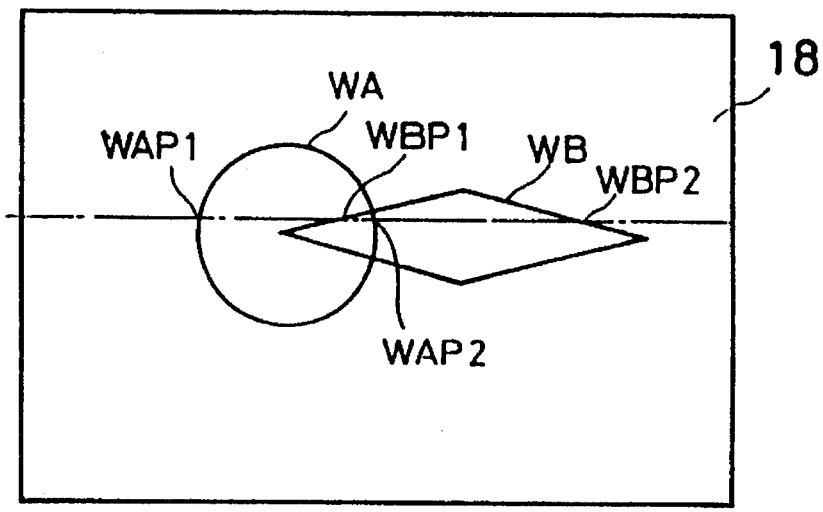
FIG. 3 is an illustrative view showing that is is possible to form a color window in FIG. 1 embodiment.
Figure 5:
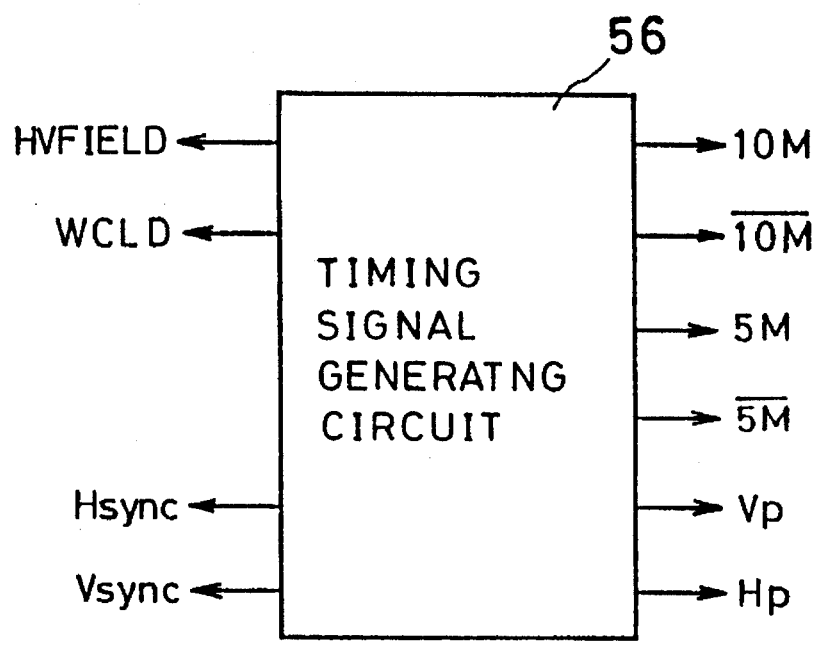
FIG. 5 is an illustrative view showing a timing signal generating circuit included in FIG. 1 embodiment.

This embodiment shown is capable of setting two windows WA and WB on the raster scan monitor 18 connected to the video processor 10 as shown in FIG. 3 and of carrying out a color arithmetic operation for the inside or the outside of the window WA and/or the window WB. The first window set data WAP1 and WAP2 are set for each line, which are data respectively indicating a left end position and a right end position of the first window WA. The second window set data WBP1 and WBP2 respectively indicate a left end position and a right end position of the second window WB. Each of the first window inside/outside specifying data WAPI0 and the second window inside/outside specifying data WBPI0 is 1-bit data specifying the inside or the outside of the first window WA and the second window WB, respectively. The first window enable signal WAEN of 1-bit data is set to enable the first window WA, and the second window enable signal WBEN of 1-bit data is set to enable the second window WB. The select data WLS1 and WLS2 are used as select signals for selecting a multiplexer 123 (FIG. 11) which will be described later.

Figure 4:
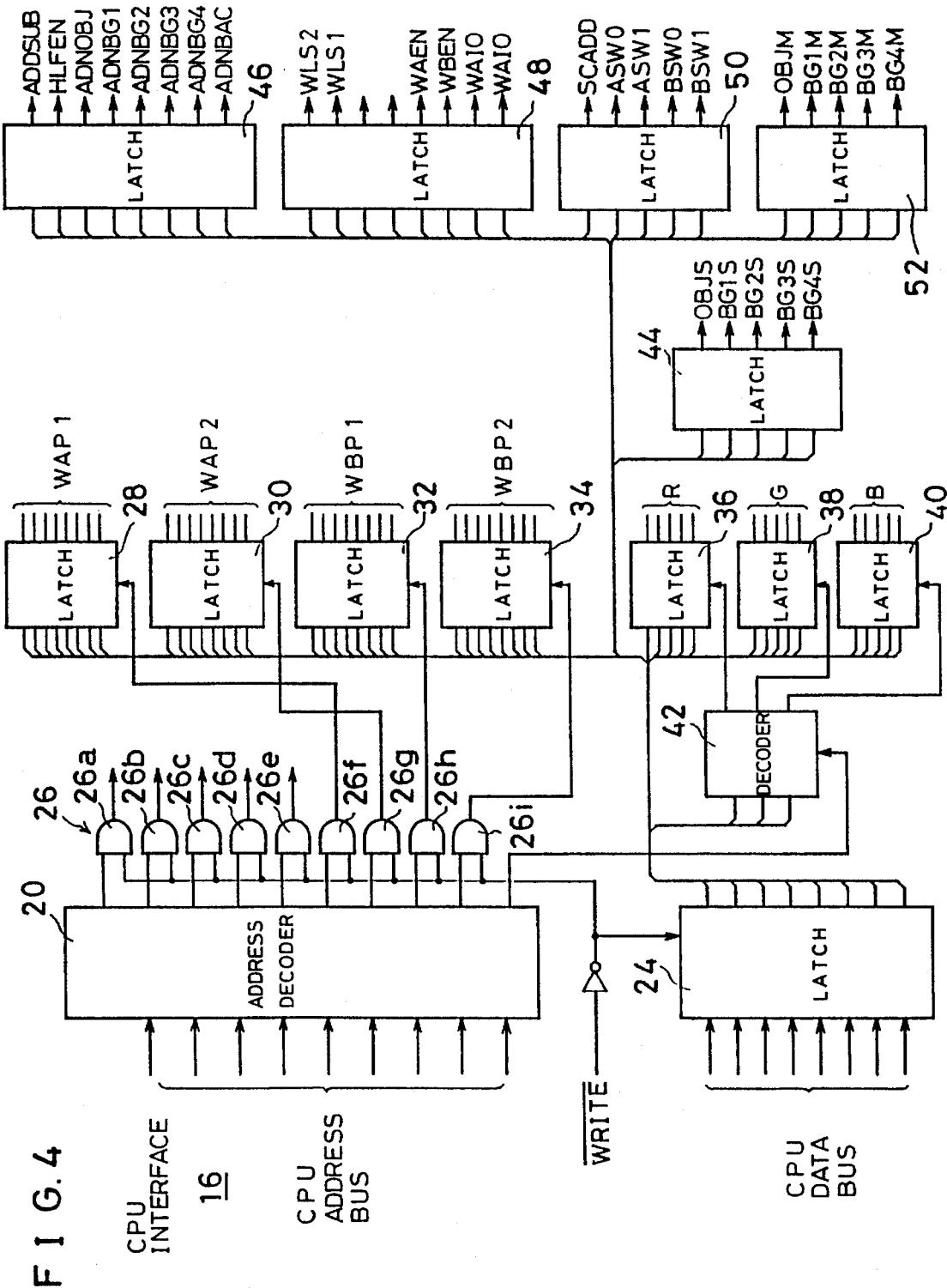
FIG. 4 is a block diagram showing a CPU interface included in FIG. 1 embodiment.

The CPU 12 reads the program data from the program storage device 14 and outputs the same through the CPU interface 16. The CPU interface 16 includes an address decoder 20 which receives address data through an address bus of the CPU 12, and a data latch 24 which receives data through a data bus of the CPU 12. The address decoder 20 decodes addresses received from the CPU 12 and provides latch enable signals to enable respective latches shown in FIG. 4. Each of the latch enable signals is applied to one input of each of AND gates 26a to 26i which constitute a gate circuit 26, and a write signal /WRITE provided by the CPU 12 is inverted and applied to the other input of each of the AND gates 26a to 26i. An inverted signal of the write signal /WRITE is also applied to the data latch 24 as a latch signal.

When the CPU 12 applies the first window left end position data WAP1 to the data bus an address specifying a data latch 28 is outputted to the address bus, and therefore, the address decoder 20 applies "1" to the AND gate 26f of the gate circuit 26. Consequently, the first window left end position data WAP1 latched by the data latch 24 is then latched by the data latch 28. Similarly, the first window right end position data WAP2, the second window left end position data WBP1 and the second window right end position data WBP2 are latched by data latches 30, 32 and 34 in response to signals provided by the AND gates 26g, 26h and 26i, respectively.

The monochromatic color data R, G and B provided by the CPU 12 are latched by data latches 36, 38 and 40, respectively. Since the monochromatic color data R, G and B are 5-bit data and the data latch 24 is an 8-bit latch, upper three bits of the data provided by the CPU 12 designate one of the data latch 36, 38 and 40. At the same time, a decoder 42 decodes the upper three bits and provides a signal to enable one of the data latches 36, 38 and 40 because the address decoder 20 provides a signal specifying the decoder 42. However, if the same data is to be written in the data latches 36, 38 and 40, the decoder 42 provides a signal to enable all the data latches 36, 38 and 40, so that the data latches 36, 38 and 40 latches the same gradation data.

Data latches 44, 46, 48, 50 and 52 latch data or signals, such as explained previously with reference to FIG. 4, read from the program data storage device 14 by the CPU 12; however, a duplicate description thereof will be omitted.

For example, a video data storage device 54 composed of a 64K-byte SRAM (static random access memory) includes a screen RAM and a character RAM. The CPU 12 transfers graphic data (dot data) stored in the character memory 14b of the program storage device 14 through the CPU interface 16 to the character RAM.

The video processor 10 is provided with a timing signal generating circuit 56. The timing signal generating circuit 56 produces timing signals by processing a fundamental clock signal having a frequency of, for example, 21.47727 MHz by, for example, a counter, a decoder and a logic circuit and applies the timing signals to the components of the video processor 10. If the fundamental clock signal is frequency divided by two, a timing signal /10M ("/" indicates inversion) is obtained. The timing signal /10M is further frequency-divided by two to obtain a timing signal /5M. The timing signal /5M corresponds to a display interval of one dot (one pixel) on the screen of the raster scan monitor 18. Accordingly, V-position data Vp indicating a position with respect to a vertical direction on the screen of the raster scan monitor 18, and H-position data Hp indicating a position with respect to a horizontal direction on the screen of the raster scan monitor 18 can be obtained by counting the timing signal /5M. Furthermore, the timing signal generating circuit 56 produces synchronization signals Vsync and Hsync necessary for the raster scan monitor 18 on the basis of the V-position data Vp and the H-position data Hp, and applies the same to a video signal producing circuit (described later). The timing signal generating circuit 56 provides a signal HVFIELD which remains "1" during the scanning operation (display period) of the raster scan monitor 18, and a timing signal WCLD which is set to "1" at the beginning of each horizontal scanning. The signal HVFIELD is applied to a main data control circuit and the subsidiary data control circuit (described later), and the signal WCLD is applied to a range signal generating circuit (described later).

Figure 6:
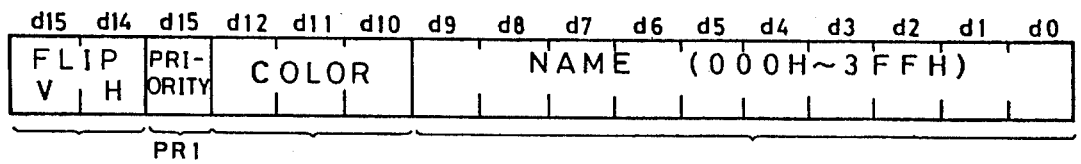
FIG. 6 is an illustrative view showing one example of still picture pattern data in FIG. 1 embodiment.

A still picture data generating circuit 58 reads pattern data (character code) of a still picture (background picture) from the program memory 14a of the program storage device 14 according to a program given thereto through the CPU interface 16 by the CPU 12, reads the graphic data of the still picture character from the video data storage device 54 on the basis of the pattern data, and then outputs the still picture data BG1, BG2, BG3 and BG4. Thus, still picture pattern data as shown in FIG. 6 is stored in the still picture pattern data storage area of the video data storage device 54 for each character. The still picture character data representing a character consists of 10-bit name data (character code), 3-bit attribute data, 1-bit priority data and 2-bit flip data. The still picture data generating circuit 58 calculates an address value of the still picture character pattern storage area in the image data storage device 54 corresponding to each line position on the screen of the raster scan monitor 18 on the basis of the H-position data Hp and the V-position data Vp provided by the timing signal generating circuit 56. Then, the graphic data (dot data) constituting a character specified by the name data stored at a location specified by the address value in the video data storage device 54 is outputted. If a plurality of still picture cells are to be displayed, a read operation for reading the name data and the priority data is repeated, whereby dot data corresponding to each still picture cell together with the priority data. Since the video processor 10 in this embodiment is capable of simultaneously providing four still picture cells, the still picture data generating circuit 58 outputs the first to fourth still picture data BG1, BG2, BG3 and BG4.

Figure 7:
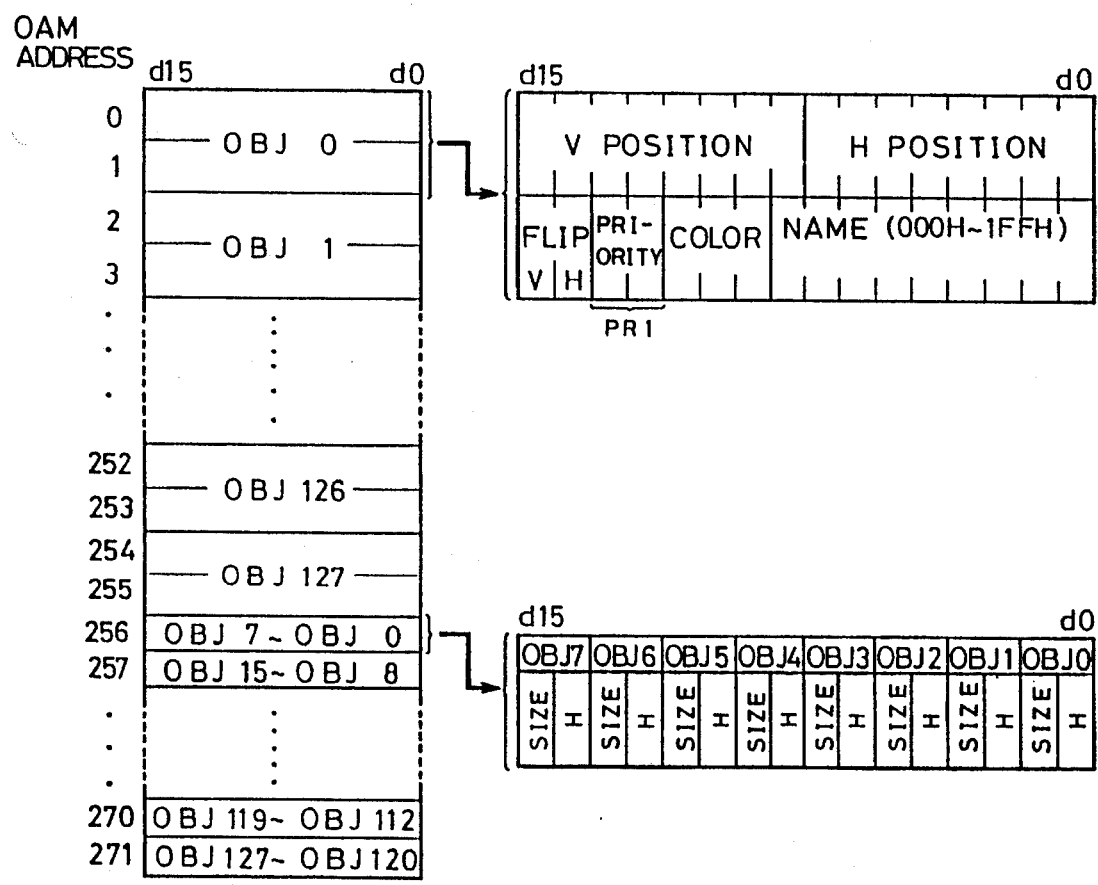
FIG. 7 is an illustrative view showing one example of moving picture data in FIG. 1 embodiment.

A moving picture data generating circuit 60 includes an OAM (object attribute memory), not shown. The OAM is capable of storing object data (attribute data) of 128 in total. As shown in FIG. 7, each object data is a 34-bit data consisting of 9-bit object specifying data (name data), 8-bit V-position data, 9-bit H-position data, 3-bit color data, 2-bit priority data, 2-bit flip data and 1-bit size select data. The character data area in the video data storage device 54 is addressed on the basis of the name data and the position data included in the object data read from the OAM and the V-position data provided by the timing signal generating circuit 56. The video data storage device 54 provides the graphic data (dot data) and the priority data of the character. Thus, the moving picture character data generating circuit 60 outputs a moving picture character data OBJ.

The timing signal /5M provided by the timing signal generating circuit 56 is given to a main/subsidiary data select circuit 62 together with the above described moving picture character data OBJ and the still picture character data BG1–BG4. The CPU 12 gives the main image specifying data OBJM–BG4M and subsidiary image specifying data OBJS-BG4S through the CPU interface 16 to the main/subsidiary data select circuit 62. The main/subsidiary data select circuit 56 determines, on the basis of the main image specifying data and the subsidiary image specifying data, which of the moving picture character data OBJ and the still picture character data BG1–BG4 is to be a main image and which of the same is to be a subsidiary image, and provides the main data and the subsidiary data alternately in synchronism with the timing signal 5M in a time sharing manner.

Figure 8:
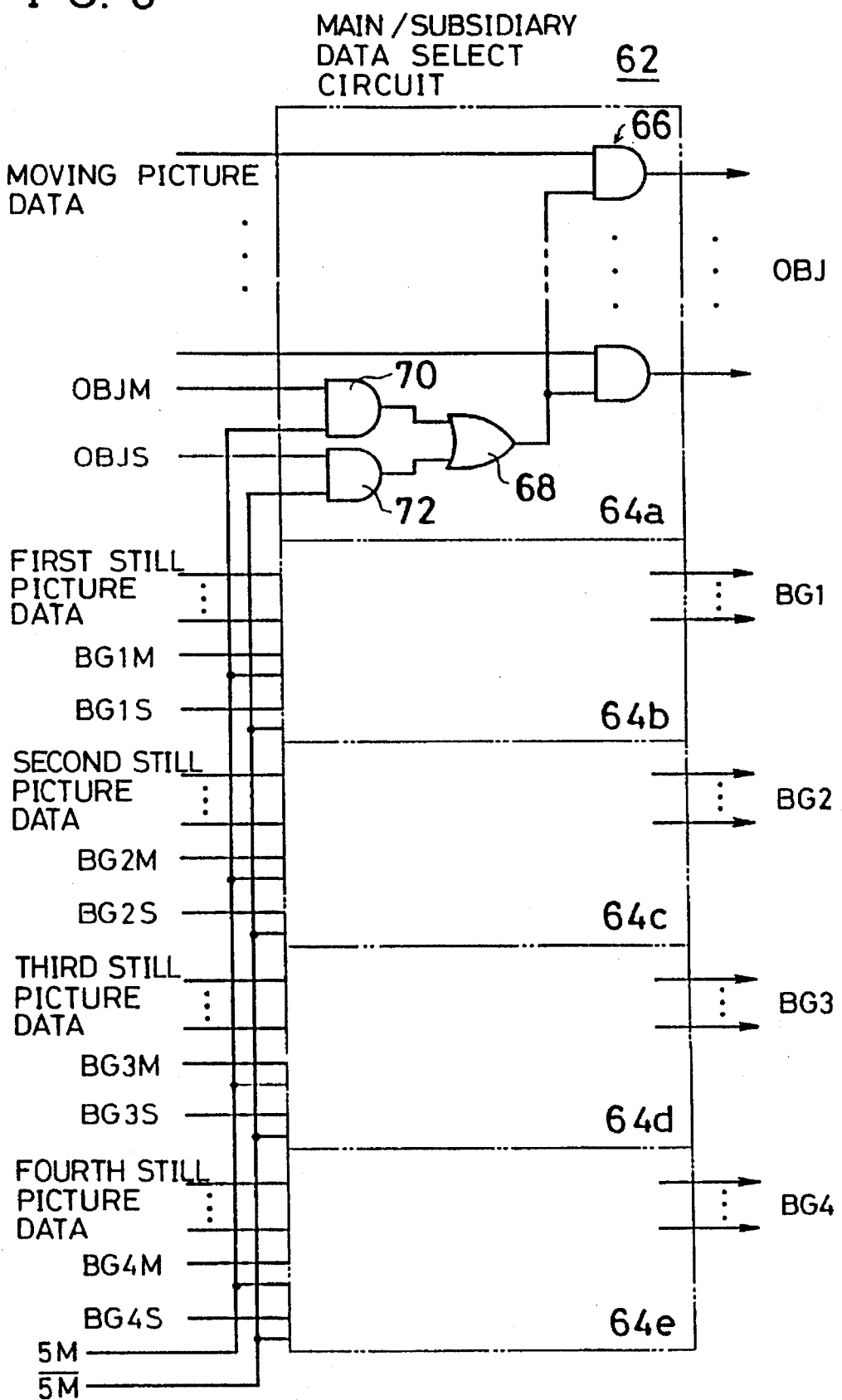
FIG. 8 is a block diagram showing a main/subsidiary data select circuit in FIG. 1 embodiment.

Specifically, the main/subsidiary data select circuit 62 includes selection gate circuits 64a to 64e as shown in FIG. 8. In FIG. 8, only the selection gate circuit 64a is shown in detail. The selection gate circuits 64a to 64e are identical and hence only the selection gate circuit 64a will be described and a description of the rest of the selection gate circuits will be omitted.

The selection gate circuit 64a includes AND gates 66, an AND gate 70, AND gate 72, and an OR gate 68. Each bit of the moving picture data OBJ provided by the animated image data generating circuit 60 is applied to one input of each of the AND gates 66, and an output of the OR gate 68 is applied to the other input of each of the AND gates 66. Outputs of the AND gates 70 and 72 are applied respectively to two inputs of the OR gate 68. The main image specifying data OBJM is applied through the CPU interface 16 to one input of the AND gate 70, and the timing signal 5M generated by the timing signal generating circuit 56 is applied to the other input of the AND gate 70. The subsidiary image specifying data OBJS is applied through the CPU interface 16 to one input of the AND gate 72, and the timing signal /5M generated by the timing signal generating circuit 56 is applied to the other input of the AND gate 72.

Therefore, if the moving picture is selected as a main image, the main image specifying data OBJM is set to "1" and the subsidiary image specifying data OBJS is set to "0". Consequently, the AND gates 66 provide the moving picture data OBJ in synchronism with the timing signal 5M. If the moving picture is selected as a subsidiary image, the subsidiary image specifying data OBJS is set to "1". Consequently, the AND gates 66 provide the moving picture data OBJ in synchronism with the timing signal /5M.

Similarly, if the first still picture, the second still picture, the third still picture or the fourth still picture is selected as a main image, the main image specifying data BG1M, BG2M, BG3M or BG4M is set to "1". Consequently, the selection gate circuit 64b, 64c, 64d or 64e provides the still picture data BG1, BG2, BG3 or BG4 in synchronism with the timing signal 5M. If the first still picture, the second still picture, the third still picture or the fourth still picture is selected as a subsidiary image, the subsidiary image specifying data BG1S, BG2S, BG3S or BG4S is set to "1" and, consequently, the selection gate circuit 64b, 64c, 64d or 64e provides the still picture data BG1, BG2, BG3 or BG4 in synchronism with the timing signal /5M.

Thus, the main/subsidiary data select circuit 62 outputs the main image data and the subsidiary image data when the timing signal 5M is "1" and when the timing signal /5M is "1", respectively.

The main/subsidiary data select circuit 62 gives the main image data and the subsidiary image data to a priority circuit 74.

In addition, the data given to the priority circuit 74 by the main/subsidiary data select circuit 62 includes the graphic data (dot data) and the priority data. In some cases, the same data includes color codes (FIGS. 6 and 7) and pallet data instead of the graphic data.

Figure 9:
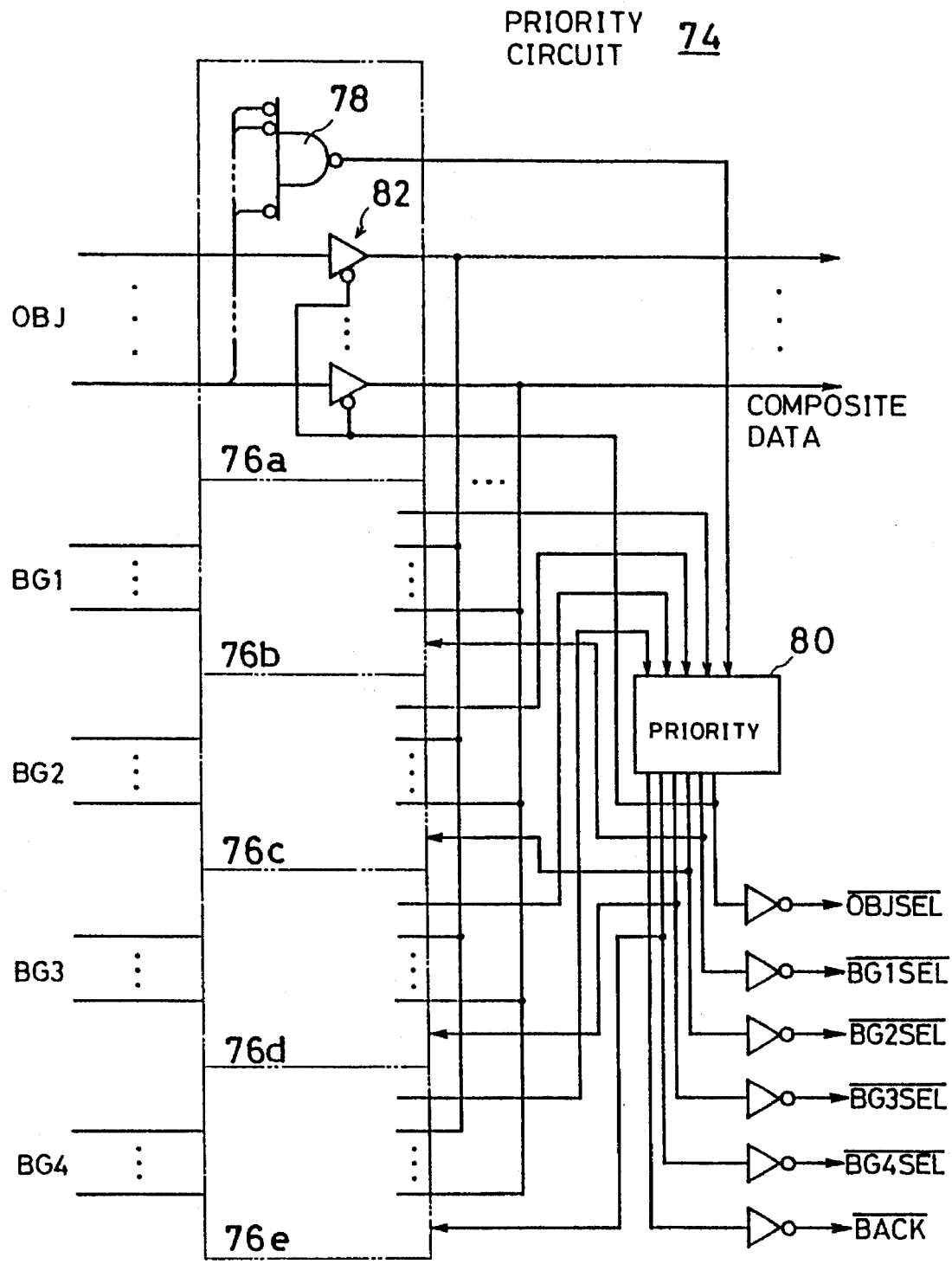
FIG. 9 is a block diagram showing a priority circuit in FIG. 1 embodiment.

The priority circuit 74 outputs either of the moving picture character data and the still picture character data to which a higher priority is assigned when the moving picture and the still picture overlap each other, and constructed as shown in FIG. 9 specifically. The priority circuit 74 includes transparency detection circuits 76a, 76b, 76c, 76d and 76e which respectively correspond to the moving picture character data OBJ, and the still picture character data BG1, BG2, BG3 and BG4. In FIG. 9, only the transparency detection circuit 76a is illustrated in detail. Since the transparency detection circuits 76a to 76e are identical and hence only the transparency detection circuit 76a is described and a description of the rest of the transparency detection circuits will be omitted.

The transparency detection circuit 76a includes an OR gate 78 and tristate gates 82. Each bit of the moving picture character data OBJ is applied to each input of the OR gate 78. The OR gate 78 gives an output to priority circuit 80 as a transparency detection signal. Each of the tristate gates 82 receives each bit of the moving picture character data OBJ. When the moving picture character is transparent, all the bits of the moving picture character data OBJ are "0". In such a case, the priority circuit 80 assigns priorities only to the character data that set the outputs of the OR gates 78 of the transparency detection circuits 76a to 76e to "1". The tristate gates 82 enable the priority circuit 74 to provide a single composite video data of the moving picture character data OBJ and the still picture character data BG1, BG2, BG3 and BG4, which are applied individually to the priority circuit 74. More specifically, the priority circuit 80 detects data having the highest priority among the data that the outputs of the transparency detecting circuits 76a to 76e are "1", and sets the composite video data identification signal thereof to "0" to output the data having the highest priority. For example, if the moving picture character data OBJ has the highest priority and the output of the OR gate 78 of the transparency detection circuit 76a is set to "1", the priority circuit 80 provides composite video data identification signal /OBJSEL of "0" and other composite video data identification signals /BG1SEL, /BG2SEL, /BG3SEL, /BG4SET and /BAC of "1". Consequently, the tristate gates 82 of the transparency detection circuit 76a are opened and the priority circuit 74 outputs only the moving picture character data OBJ.

The composite video data identification signal /BACK indicates that neither the moving picture data OBJ nor the still picture character data BG1 to BG4 are provided. In such a state, the screen displays a background color.

As described before, these data are outputted as the main data and the subsidiary data from the main/subsidiary data select circuit 62 in a time sharing manner, and hence the priority circuit 74 determines the respective priorities of the main data and the subsidiary data.

If the composite data provided by the priority circuit 74 includes the color codes and the pallet data instead of the graphic data, such data is applied to a color RAM 84.

The color RAM 84 receives 8-bit pallet select data through the CPU interface 16 from the CPU 12 and converts the color codes and the pallet data provided by the priority circuit 74 into 15-bit color data (gradation data) consisting of three 5-bit color data for the three colors. The color data represents gradations represented by five bits for each color of red, green and blue. Thus, the color data is a 15-bit data.

If the data provided by the main/subsidiary select circuit 62, that is, the composite data provided by the priority circuit 74 is the graphic data, the composite data is directly sent to a data selector 86. The CPU 12 applies a mode signal "1" indicating a direct mode or a mode signal "0" indicating an indirect mode to the data selector 86. The data selector 86 selects the color data among those stored in the color RAM 84 if the mode signal is "0", and selects the 15-bit color data provided by the priority circuit 74 if the mode signal is "1".

In addition, the main data and the subsidiary data are outputted on respective path, and the subsidiary data is given to a monochromatic color add circuit 88.

The monochromatic color add circuit 88 receives also the background color data provided by the data latches 36, 38 and 40 of the CPU interface 16 (FIG. 4), and adds the background color data as color data to portions deficient in the subsidiary data or replaces the subsidiary data completely with the background color data.

Referring to FIG. 10 specifically showing the monochromatic color add circuit 88. 5-bit background color data respectively for red, green and blue are given through the CPU interface 16 to a data selector 90, and 5-bit color data respectively for red, green and blue are given through a latch circuit 92 to the data selector 90 by the data selector 86 (FIG. 1). The latch circuit 92 includes DFFs and latches the color data provided by the data selector 86 in response to the timing signal /10M. The composite video data identification signal /BACK from the priority circuit 74 and the timing signal /10M are applied to a DFF 94. The DFF 94 serves for timing regulation. The DFF 94 latches the composite video data identification signal /BACK provided by the priority circuit 74 in response to the timing signal /10M. An output Q of the DFF 94 is applied through a NOR gate 96 to a select signal input of the data selector 90, and an output /Q of the DFF 94 is applied to one input of an OR gate 98. A signal SCADD provided through the CPU interface 16 by the CPU 12 is inverted by an inverter and then applied to the other input of the OR gate 98. If the signal SCADD is "0", the output of the NOR gate 96 is "0", and therefore, the data selector 90 selects the background color data. If the signal SCADD is "1", the output of the NOR gate 96 is dependent on the signal /BACK. As mentioned above, the signal /BACK indicates that there is no picture data and the same is applied as subsidiary data to the NOR gate 96 at an appropriate time by the DFF 94. Accordingly, the data selector 90 selects the background color data if the subsidiary data does not include any picture data, and the same selects the color data if the subsidiary data includes some picture data.

Thus, the monochromatic color add circuit 88 provides the background color data as the subsidiary data if there is no picture data. In such a case, the OR gate 98 provides a signal SBCK indicating that the background color data is selected as subsidiary data.

The subsidiary data provided by the monochromatic color add circuit 88 is given to a subsidiary data control circuit 100, and the main data provided by the data selector 86 is given to a main data control circuit 102.

A display range signal generating circuit 104 will be described now. The display range signal generating circuit 104 provides a color window range signal CW specifying a color window range on the screen of the raster scan monitor 18. As shown in detail in FIG. 11, the display range signal generating circuit 104 has a counter 106. The timing signal 5M generated by the timing signal generating circuit 56 is applied to a clock input of the counter 106. A count value of the counter 106 is updated for every dot on the screen of the raster scan monitor 18. The timing signal WCLD generated by the timing signal generating circuit 56 is applied to a reset input of the counter 106. Accordingly, the count value counted by the counter 106 is incremented by the clock signal 5M at the beginning of each horizontal scanning.

Figure 11:
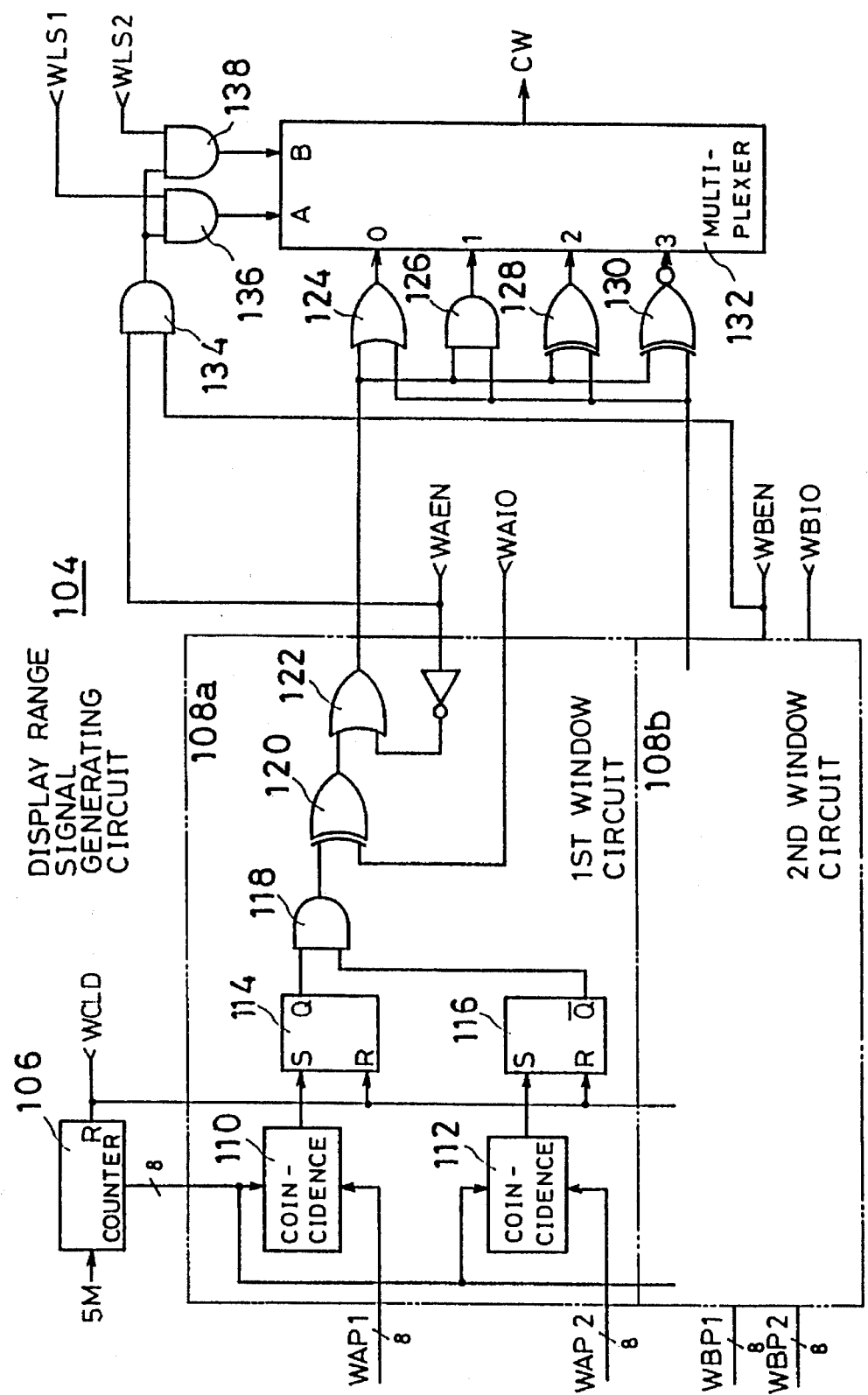
FIG. 11 is a block diagram showing an image range signal generating circuit in FIG. 1 embodiment.

An output of the counter 106 is given to a first window circuit 108a and a second window circuit 108b. In FIG. 11, only the first window circuit 108a is shown in detail. Since the first window circuit 108a and the second window circuit 108b are identical in construction, only the first window circuit 108a will be described.

The first window circuit 108a has two coincidence detection circuits 110 and 112. The output of the counter 106 is applied to one input of each of the coincidence detection circuits 110 and 112. The first window left end position data WAP1 provided by the data latch 28 of the CPU interface 16 is applied to the other input of the coincidence detection circuit 110, and the first window right end position data WAP2 provided by the data latch 30 of the CPU interface 16 is applied to the other input of the coincidence detection circuit 112. The coincidence detection circuit 110 compares the left end position data WAP1 and the count value counted by the counter 106, and gives a set signal to an RS-FF 114 upon the coincidence of the both. Similarly, the coincidence detection circuit 112 compares the count value counted by the counter 106 and the right end position data WAP2, and then gives a set signal to an RS-FF 116 upon the coincidence of the both. Since the RS-FF 114 and the RF-FF 116, similarly to the counter 106, are reset by the signal WCLD, outputs Q of the RS-FF 114 and RS-FF 116 are set to "1" when the set signal is applied thereto. However, since the RS-FF 116 provides an output /Q, the output of the RS-FF 116 is set to "0" when a set signal is applied thereto.

The output Q of the RS-FF 114 and an inversion of the output Q of the RS-FF 116 are applied to the inputs of an AND gate 118. Therefore, the AND gate 118 outputs "1" between a time corresponding to the first window left end position data and a time corresponding to the right end position data in each horizontal scanning. An output of the AND gate 118 is applied to one input of an exclusive OR gate 120, and a first window inside-outside specifying signal WAI0 provided through the CPU interface 16 is applied to the other input of the exclusive OR gate 120. The exclusive OR gate 120 inverts the output of the AND gate 118 when the signal WAI0 is "1" and applies the same to one input of an OR gate 122. The first window enable signal WAEN provided through the CPU interface 16 is inverted by an inverter and applied to the other input of the OR gate 122. The OR gate 122 outputs "1" during a period when the output of the AND gate 118 is "1" while the signal WAEN is "1".

Similarly, an OR gate of the second window circuit 108b provides an OR gate output. The OR gate outputs of the first window circuit 108a and the second window circuit 108b are applied to an OR gate 124, an AND gate 126, an exclusive OR gate 128 and an exclusive NOR gate 130 as two inputs thereof, respectively. Outputs of the gates 124 to 130 are applied to a multiplexer 132.

The signals WAEN and WHEN provided through the CPU interface 16 are applied to inputs of an AND gate 136, and an output of the AND gate 136 is applied to one input of each of AND gates 136 and 138. A control signal WLS1 provided through the CPU interface 16 is applied to the other input of the AND gate 136, and a control signal WLS2 is applied to the other input of the AND gate 138. Outputs of the AND gates 136 and 138 are respectively applied as select signals A and B to the multiplexer 132.

The multiplexer 132 selects one of the four inputs applied by the gates 124 to 130 according to the select signals A and B, and outputs a selected one as a color window range signal CW.

When only the first window or the second window is used, the signal WAEN or WBEN provided though the CPU interface 16 is set to "1". In this state, the output of the AND gate 134 is "0". Consequently, the outputs of the AND gates 136 and 138 are set to "0", and therefore, the multiplexer 132 selects the output of the OR gate 124 as the color window range signal CW. In enabling only the first window WA, the color window range signal CW is set to "1" for a hatched area shown in FIG. 12A when the first inside-outside specifying signal WAI0 is "1" or a hatched area shown in FIG. 12B is set to "1" when the first window inside-outside specifying signal WAI0 is "0". In enabling only the second window WB, the color window range signal CW is set to "1" for a hatched area shown in FIG. 13A when the second inside-outside specifying signal WBI0 is "1" or the color window range signal CW is set to "1" for a hatched area shown in FIG. 13B when the second inside-outside specifying signal WBI0 is "0".

If both the signals WAEN and WBEN are set to "1", the multiplexer 130 selects the output of the AND gate 126, the output of the exclusive OR gate 128 or the output of the exclusive NOR gate 130 as the color window range signal CW according to the control signals WLS1 and WLS2. In this case, both the inside-outside specifying signals WAI0 and WBI0 are set to "1".

Figure 15:
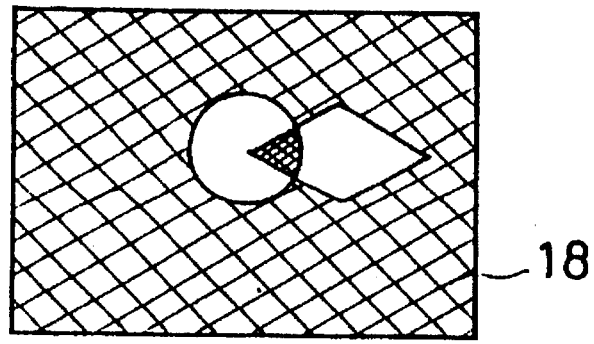
FIG. 15 is an illustrative view showing the screen of the raster scan monitor in a state where the first and second windows are enabled in an exclusive OR manner.
Figure 16:
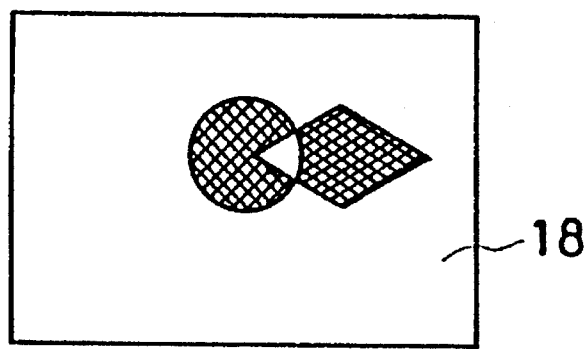
FIG. 16 is an illustrative view showing the screen of the raster scan monitor in a state where the first and second windows are enabled in an exclusive NOR manner.

If both the control signals WLS1 and WLS2 are set to "0", the multiplexer 132 selects the output of the AND gate 126. In this case, the color window range signal CW for a hatched area shown in FIG. 14 is set to "1". If the control signal WLS1 is set to "0" and the control signal WLS2 is set to "1", the multiplexer 132 selects the output of the exclusive OR gate 128. In this case, the color window range signal CW is set to "1" for a hatched area shown in FIG. 15. If both the control signals WLS1 and WLS2 are set to "1", the multiplexer 132 selects the output of the exclusive NOR gate 130. In this case, the color window range signal CW is set to "1" for a hatched area shown in FIG. 16.

It is to be noted in advance that an arithmetic circuit, which will be described later executes a predetermined arithmetic operation according to instructions provided by an operation control only during a period when the color window range signal CW is "1".

FIG. 17 shows an operation control circuit 140.

The CPU 12 reads the data ASW1, ASW0, BSW1 and BSW0 from the program storage device 14 and sends out the same through the CPU interface 16. The data or signals ASW0, 1 and BSW0, 1 are signals for determining how the color window range signal CW provided by the display range signal generating circuit 104 is to be utilized in executing the arithmetic operation in the arithmetic unit 190. If both the signals ASW0 and ASW1 are set to "0", a NOR gate 142 applies an output signal of "1" to an OR gate 144. Accordingly, a signal MAINAREA becomes "1", and is applied to the above described main data control circuit 102 and to one input of an AND gate 146.

If both the signals ASW0 and ASW1 are set to "1", the output of the NOR gate 142 is "0". Since the signal ASW0 is applied to an AND gate 148 after inversion, an output of the AND gate 148 becomes "0". Since the signal ASW1 is applied to an AND gate 150 after inversion, an output of the AND gate 150 is also "0" and hence an output of the OR gate 144 becomes "0". The output of the OR gate 144 becomes independent of the color image range signal CW.

If the signal ASW0 is "1" and the signal ASW1 is "0", the output of the NOR gate 142 is "0" and the output of the AND gate 150 is "0". Then, the AND gate 148 outputs the color image range signal CW as it is. The color image range signal CW passes through the OR gate 144 to be used as the signal MAINAREA.

If the signal ASW0 is "0" and the signal ASW1 is "1", the OR gate 144 provides an inverted color image range signal CW passed through the AND gate 150.

Gates 152 to 158 operate similarly to the gates 142 to 150 with respect to the signals BSW0 and BSW1. Accordingly, respective states of the signals MAINAREA and SUBAREA provided by the OR gates 114 and 154 can be represented as in the following table.

TABLE

| ASW0 (or BSW0) | 0 | 1 | 0 | 1 |
|---|---|---|---|---|
| ASW1 (or BSW1) | 0 | 0 | 1 | 1 |
| MAINAREA (or SUBAREA) | 1 | CW | /CW | 0 |

The operation control circuit 140 has six AND gates 160, 162, 164, 166, 168 and 170. The signal /OBJSEL provided by the priority circuit 74 and the data ADNOBG provided through the CPU interface 16 are applied to two inputs of the AND gate 160. Similarly, the signal /BG1SEL and the data ADNBG1 are applied to two inputs of the AND gate 162. The signal /BG2SEL and the data ADNBG2 are applied to two inputs of the AND gate 164. The signal /BG3SEL and the data ADNBG3 are applied to the AND gate 166. The signal /BG4SET and the data ADNBG4 are applied to the AND gate 168. The signal /BACK and the data ADNBAC are applied to the AND gate 170. Accordingly, each of the AND gates 160 to 170 provides an add instruction signal when the both signals applied to its inputs are "1". The add instruction signals provided by the AND gates 160 to 170 are transferred through an OR gate 172 to the subsidiary data control circuit 100 and to the input of the AND gate 146.

Also applied to the input of the AND gate 146 is the signal /SBCK provided by the monochromatic color add circuit 88. An output of the AND gate 146 and the data HLFEN provided through the CPU interface 16 are applied to inputs of an AND gate 174. Then, the AND gate 174 provides a signal of "1" only when the add instruction signal is provided and both the signals MAINAREA and SUBAREA are "1". The output of the AND gate 174 is applied to a DFF 176. The timing signal /5M provided by the timing signal generating circuit 56 is applied to a clock terminal of the DFF 176. An output signal HLFCNT of the DFF 176 is given to the arithmetic unit (described later).

Referring to FIG. 18, the above described subsidiary data control circuit 100 has a 3-input AND gate 178. Signals SUBEN, HVFEELD and SUBAREA are applied to the inputs of the AND gate 178. The signals SUBEN and SUBAREA are provided by the above described operation control circuit 140. The signal HVFEELD is provided by the timing signal generating circuit 56 and remains "1" during a period when the raster scan monitor 18 is in display operation. An output signal of the AND gate 178 is applied to one input of each of AND gates 180. Each bit of the color data provided by the monochromatic color add circuit 88 is applied to the other input of each of the AND gates 180. The color data from the monochromatic color add circuit 52 is given to a subsidiary data register 182 (FIG. 1) only when all the signals SUBEN, SUBAREA and VHFIELD are "1".

In operating predetermined video data of the main data in combination with the subsidiary data, for example, when the moving picture character data OBJ and the still picture character data BG1 are designated as the main data, and only the still picture character data BG1 is to be operated in combination with the subsidiary data, the signal SUBEN is set to "1" if the main data is the still picture character data BG1, and the subsidiary data is given to the subsidiary data register 182.

In a state where the main data and the subsidiary data are operated only in a specific area on the screen of the raster scan monitor 18 is set by the foregoing window mask function, the signal SUBAREA is "1" only for the specific area.

The main data control circuit 102 shown in FIG. 19 has a 2-input AND gate 184. The above described signals HVFYELD and MAINAREA are applied to inputs of the AND gate 184. The signal MAINAREA is "1" for a specific area on the screen of the raster scan monitor 18, and the signal HVFYELD is "1" while the raster scan monitor 18 is in display operation. An output signal of the AND gate 184 is applied to one input of each of AND gates 186 and each bit of the main data is applied to the other input of each of the AND gate 186. The main data is applied to a main data register 188 (FIG. 1) only for the specific area on the screen of the raster scan monitor 18 while the raster scan monitor 18 is in display operation.

Figure 20:
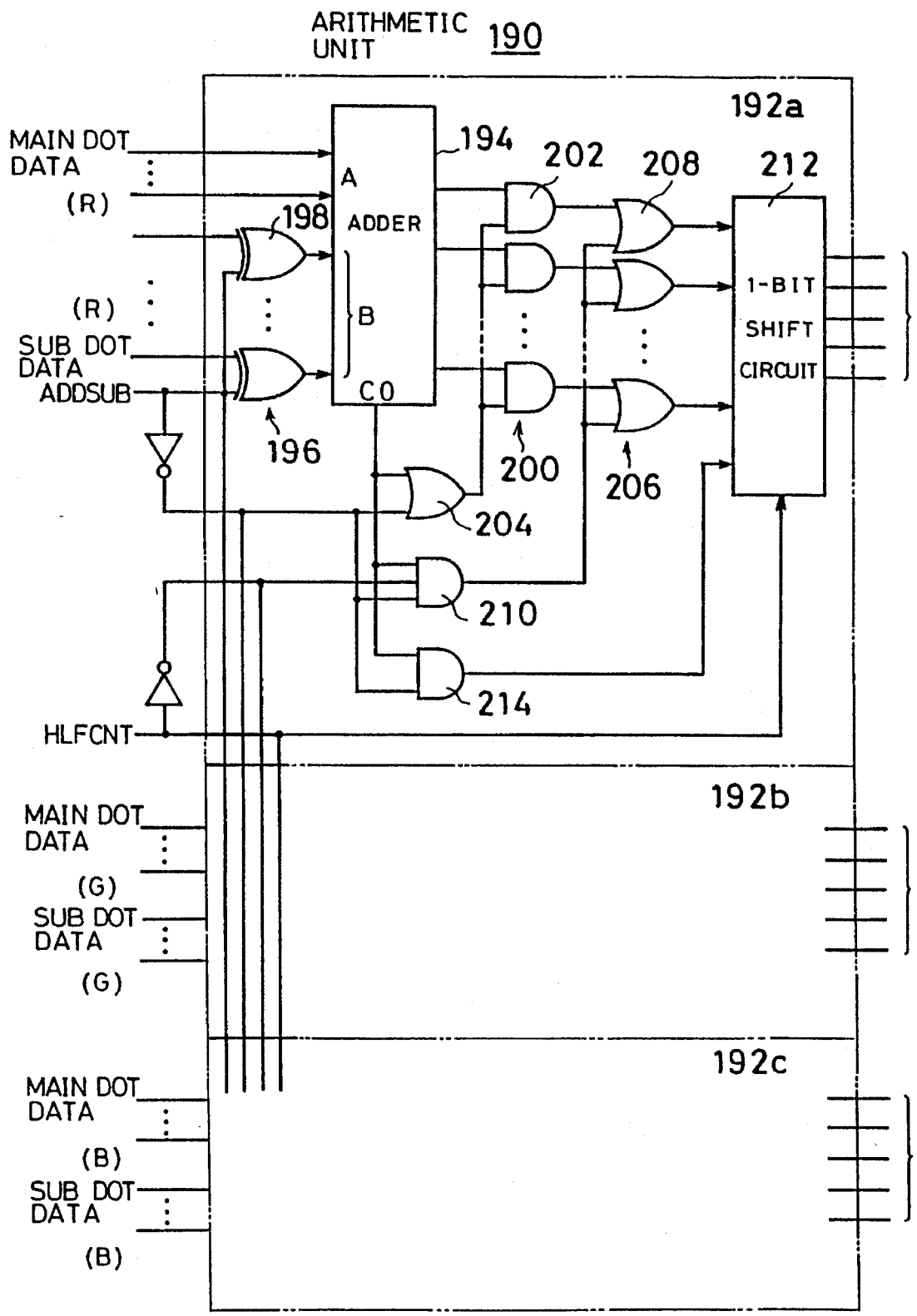
FIG. 20 is a block diagram showing an arithmetic circuit in FIG. 1 embodiment.

As shown in FIG. 20, the arithmetic unit 190 includes an R arithmetic circuit 192a, a G arithmetic circuit 192b and a B arithmetic circuit 192c respectively for red, green and blue. In FIG. 20, only the R arithmetic circuit 192a is shown in detail. Since the arithmetic circuits 192a, 192b and 192c are identical in construction, only the R arithmetic circuit 192a will be described and the description of the rest of the arithmetic circuits will be omitted.

The R arithmetic circuit 192a has an adder 194. The adder 194 has an input A that receives 5-bit gradation data for red provided by the main data register 188, and an input B that receives an output of a complement circuit 196. The complement circuit 196 receives the subsidiary data for red from the subsidiary data register 182. The complement circuit 196 includes five exclusive OR gates 198 corresponding respectively to five bits of the subsidiary data. Each bit of the subsidiary data is applied to one input of each of the exclusive OR gates 198 and data ABDSUB provided through the CPU interface 16 is applied to the other input of each exclusive OR gate 198. The complement circuit 196 gives the data provided by the subsidiary register 182 to the adder 194 as it is if the data ABDSUB is "0", and gives "the two's complement" to the adder 194 if the data ABDSUB is "1". Accordingly, the adder 194 adds the main data and the subsidiary data if the data ABDSUB is "0", and subtracts the subsidiary data from the main data if the data ABDSUB is "1".

An output of the adder 194 is given to a gate circuit 200 which includes five AND gates 202 corresponding respectively to bits of five bits of the output from the adder 194. Each bit of the output signal of the adder 194 is applied to one input of each of the AND gates 202, and an output signal of an OR gate 204 is applied to the other input of each of the AND gates 202. The data ABDSUB is applied through an inverter to one input of the OR gate 204, and a carry signal CO provided by the adder 194 is applied to the other input of the OR gate 204. Accordingly, outputs of all the AND gates 202 are "0" when the data ABDSUB is "0", namely, when a result of subtraction by the adder 194 is negative.

The output of the gate circuit 200 is given to another gate circuit 206 which includes five OR gates 208 and an AND gate 210. Each bit of the output of the gate circuit 200 is applied to one input of each of the OR gates 208, and an output of the AND gate 210 is applied to the other input of each of the OR gates 208. The AND gate 210 receives the carry signal CO provided by the adder 194, the data ABDSUB through an inverter, and a signal HLFCNT provided by the operation control circuit 140 through an inverter. Accordingly, the gate circuit 206 sets all the bits forcibly to "1" according to the output of the AND gate 210 when a result of addition by the adder 194 overflows.

An output of the gate circuit 206 is given to a 1-bit shift circuit 212. The 1-bit shift circuit 212 shifts the data received from the gate circuit 206 by one bit in response to an output of an AND gate 214 when the operation control circuit 140 provides the signal HLFCNT. The AND gate 214 receives the carry signal CO from the adder 194 and the data ABDSUB through an inverter. The AND gate 214 provides a signal of "1" when the adder 194 overflows. Accordingly, the 1-bit shift circuit 212 adds "1" provided by the AND gate 214 to the most significant bit to provide a maximum value Rmax in calculating a mean value according to the output signal HLFCNT of the operation control circuit 140, because the maximum value Rmax cannot be obtained if the data is shifted by one bit to calculate the mean value when the adder 194 overflows.

Thus, the 1-bit shift circuit 212 provides the five upper bits in calculating the mean value and provides the five lower bits in other cases.

An output of the 1-bit shift circuit 212 is given to a video signal producing circuit 216. The video signal producing circuit 216 receives the synchronization signals Hsync and Vsync from the timing signal generating circuit 56. The video signal producing circuit 216 converts the gradation data for red, green and blue provided by the arithmetic circuit 190 into a television composite video signal including an RGB signal and a synchronization signal by a well-known method, and gives the same to the raster scan monitor 18.

In addition, a memory cartridge incorporating a semiconductor memory is used as an external storage unit in the above described embodiments; however, it is possible to use an external storage unit such as a CD-ROM in the present invention. In a case of use of the memory cartridge, the program data including the character data of the moving picture characters and the still picture characters and the aforementioned color arithmetic program data are stored in the semiconductor memory, and the CPU 12 generates control data for the moving picture characters and the still (background) picture characters on the basis of the program data read from the semiconductor memory and outputs the same to the components of the video processor 10.

In contrast, in a case of use of the CD-ROM, the above described program data and the color arithmetic program data are optically recorded as digital data in the CD-ROM (not shown). In addition, an optical reader for optically reading recorded date on the CD-ROM is connected to a suitable connector such as a expansion connector. Even if the CD-ROM is used as the external storage unit, a memory cartridge is also used. In this case, the memory cartridge is comprised with a ROM (not shown) that stores a starting program for controlling an operation of the optical reader, a buffer RAM (not shown) for temporarily storing the data read from the CD-ROM, and etc. Then, prior to a start of a display operation, the CPU 12 applies control data to the optical reader on the basis of the starting program of the ROM to cause the optical reader read the recorded data of the CD-ROM. A portion of the character data read from the CD-ROM is transferred to the character RAM and the program data is transferred to the buffer RAM included in the memory cartridge. The CPU 12 controls the components of the video processor 10 on the basis of the program data stored in the buffer RAM. That is, after the data read from the CD-ROM by the optical reader has been transferred to the respective memories, the CPU 12 and the video processor 10 execute the display operation by accessing the respective memories as done in the previous embodiments.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing apparatus for displaying an image on a display according to color data of each dot, comprising:

image data generating means for generating color data of a plurality of images;

first color data generating means for selecting a first color data of an arbitrary first image out of said plurality of images generated by said image data generating means;

second color data generating means for selecting a second color data of an arbitrary second image out of said plurality of images generated by said image data generating means;

command generating means for generating an addition command or a subtraction command;

data outputting means for receiving one of said first color data and said second color data and for outputting said one of said first color data and said second color data unchanged in response to said addition command and for outputting data that is obtained by logically inverting said one of said first color data and said second color data in response to said subtraction command;

adding means for adding data outputted from said data outputting means to the other of said first color data and said second color data to output result color data; and video signal generating means for converting the result color data from said adding means into a video signal to apply said video signal to said display, wherein said first color data generated by said first color data generating means and said second color data generated by said second color data generating means include gradation data representing gradation of each of red, blue and green, and said adding means executes for each of red, blue and green an addition operation of said gradation data included in said other of said first color data and said second color data, and said gradation data included in said data outputted by said data output means.

2. An image processing apparatus according to claim 1, further comprising range data generating means for generating range data specifying a range on a screen of said display, wherein said adding means executes an addition operation by using said other of said first color data and said second color data, and said data outputted from said data outputting means in the range specified by said range data.

3. An image processing apparatus according to claim 1, wherein said image data generating means generates said color data for each said dot to display said plurality of images each comprising a plurality of dots in each of a vertical direction and a horizontal direction, and said adding means executes an addition operation on said other of said first color data and said second color data, and said data outputted from data outputting means for each said dot.

4. An image processing apparatus according to claim 1, further comprising monochromatic color data generating means for generating monochromatic color data that specifies a color of a whole screen of said display as a monochromatic color, wherein said adding means executes an addition operation by using at least one of said other of said first color data and said second color data and said data outputted from said data outputting means, and said monochromatic color data generated by said monochromatic color data generating means.

5. An image processing apparatus according to claim 1, wherein said image data generating means generates said color data each including priority data, and said first color data generating means selects color data of a plurality of images and generates said first color data by combining the plurality of color data according to the priority data included in said plurality of color data.

6. An image processing apparatus according to claim 1, wherein said image data generating means generates said color data each including priority data, and said first color data generating means selects color data of a first plurality of images and generates said first color data by combining color data of said first plurality of images according to the priority data included in said color data of said first plurality of images, and said second color data generating means selects color data of a second plurality of images and generates said second color data by combining said color data of said second plurality of images according to the priority data included in said color data of said second plurality of images.

7. An external storage unit in combination with an image processing apparatus for displaying an image on a display according to the color data for each dot, said external storage unit comprising:

character data storing means for storing character data of moving picture characters and still picture characters; and color arithmetic program storing means for storing a color arithmetic program for executing a color arithmetic operation, said color arithmetic program including command data for specifying an addition operation or a subtraction operation;

said image processing apparatus including first color data generating means for generating first color data of a first image in response to said character data read from said external storage unit; second color data generating means for generating second color data of a second image in response to said character data read from said external storage unit; data outputting means for receiving one of said first color data and said second color data and for outputting said one of said first color data and said second color data unchanged when said command data specifies said addition operation and for outputting data that is obtained by logically inverting said one of said first color data and said second color data when said command data specifies said subtraction operation; adding means for adding data outputted from said data outputting means to the other of said first color data and said second color data to output result color data in response to said color arithmetic program read from said external storage unit;

data shift command generating means for generating a data shift command;

data shift means for receiving said result data from said adding means and for outputting shifted color data that is obtained by 1-bit shifting said result color data in response to said data shift command or outputting said result color data as it is when no data shift command is outputted from said data shift command generating means, and video signal generating means for converting said shifted color data or said result color data outputted from said data shift means into a video signal.

8. An external storage unit according to claim 7, wherein said color arithmetic program includes a range data program for generating range data specifying a range on a screen of said display, and said adding means executes an addition operation by using said other of first color data and said second color data and said data outputted by said data output means in the range specified by said range data.

9. An external storage unit according to claim 7, wherein said color arithmetic program includes a monochromatic color data program for generating monochromatic color data that specifies a color of a whole screen of said display as a monochromatic color, and said adding means executes an addition operation by using at least one of said other of said first color data and said second color data and said data outputted by said data output means, and the monochromatic color data generated by said monochromatic color data generating means.

10. An external storage unit according to claim 7, wherein said image data generating means generates said color data each including priority data, and said first color data generating means selects color data of a plurality of images and generates said first color data by combining the plurality of color data according to the priority data included in said plurality of color data.

11. An external storage unit according to claim 7, wherein said image data generating means generates said color data each including priority data, and said first color data generating means selects color data of a first plurality of images and generates said first color data by combining color data of said first plurality of images according to the priority data included in said color data of said first plurality of images, and said second color data generating means selects color data of a second plurality of images and generates said second color data by combining said color data of said second plurality of images according to the priority data included in said color data of said second plurality of images.

12. An image processing apparatus for displaying an image on a display according to color data of each dot, comprising:

image data generating means for generating color data of a plurality of images;

first color data generating means for selecting a first color data of an arbitrary first image out of said plurality of images generated by said image data generating means;

second color data generating means for selecting a second color data of an arbitrary second image out of said plurality of images generated by said image data generating means;

command generating means for generating an addition command or a subtraction command;

data outputting means for receiving one of said first color data and said second color data and for outputting said one of said first color data and said second color data unchanged in response to said addition command and for outputting data that is obtained by logically inverting said one of said first color data and said second color data in response to said subtraction command;

adding means for adding data outputted from said data outputting means to the other of said first color data and said second color data to output result color data;

video signal generating means for converting the result color data from said adding means into a video signal to apply said video signal to said display;

data shift command generating means for generating a data shift command; and data shift means for receiving said result data from said adding means and for outputting shifted color data that is obtained by 1-bit shifting said result color data in response to said data shift command or outputting said result color data as it is when no data shift command is outputted from said data shift command generating means, wherein said video signal generating means converts said shifted color data or said result color data outputted from said data shift means into the video signal.

13. An image processing apparatus according to claim 12, wherein said first color data generated by said first color data generating means and said second color data generated by said second color data generating means include gradation data representing gradation of each of red, blue and green, and said adding means executes for each of red, blue and green an addition operation of said gradation data included in said other of said first color data and said second color data, and said gradation data included in said data outputted by said data output means.

14. An image processing apparatus according to claim 12, wherein said image data generating means generates said color data each including priority data, and said first color data generating means selects color data of a plurality of images and generates said first color data by combining the plurality of color data according to the priority data included in said plurality of color data.

15. An image processing apparatus according to claim 12, wherein said image data generating means generates said color data each including priority data, and said first color data generating means selects color data of a first plurality of images and generates said first color data by combining color data of said first plurality of images according to the priority data included in said color data of said first plurality of images, and said second color data generating means selects color data of a second plurality of images and generates said second color data by combining said color data of said second plurality of images according to the priority data included in said color data of said second plurality of images.

16. An image processing apparatus for displaying an image on a display according to color data of each dot, comprising:

a first color generator for generating first color data of a first image;

a second color generator for generating second color data of a second image;

a range generator for generating color window range data specifying a color window range within a screen of said display;

an arithmetic circuit for performing an arithmetic operation on said first color data and said second color data only within the range specified by said color window range data to output result color data;

a data shift command generator for generating a data shift command;

a data shift circuit for receiving said result color data from said arithmetic circuit and for outputting shifted color data that is obtained by 1-bit shifting said result color data in response to said data shift command or outputting said result color data as it is when no data shift command is outputted from said data shift command generator, and a video signal generator for converting said shifted color data or said result color data outputted from said data shift circuit into a video signal.

17. An image processing apparatus according to claim 16, wherein said first color data generated by said first color data generator and said second color data generated by said second color data generator include gradation data representing gradation of each of red, blue and green, and said arithmetic circuit executes for each of red, blue and green an arithmetic operation on said gradation data included in said first color data or said second color data.

18. An image processing apparatus according to claim 16, further comprising a monochromatic color data generator for generating monochromatic color data that specifies a color of a whole screen of said display as a monochromatic color, wherein said arithmetic circuit executes an addition operation by using at least one of said first color data and said second color data and said monochromatic color data generated by said monochromatic color data generator.

19. An external storage unit in combination with an image processing apparatus for displaying an image on a display according to the color data of each dot, said external storage unit comprising:

character data storing means for storing character data of moving picture characters and still picture characters; and color arithmetic program storing means for storing a color arithmetic program for executing a color arithmetic operation, said color arithmetic program including color window range data for specifying a color window range within a screen of said display; wherein said image processing means comprises means for generating first color data of a first image on the basis of character data read from said external storage unit;

means for generating second color data of a second image on the basis of character data read from said external storage unit;

means for performing an arithmetic operation on said first color data and said second color data only within the range specified by said color window range data on the basis of said color arithmetic program read from said external storage unit to output result color data;

data shift command generating means for generating a data shift command; and data shift means for receiving said result color data from said means for performing an arithmetic operation and for outputting shifted color data that is obtained by 1-bit shifting said result color data in response to said data shift command or outputting said result color data as it is when no data shift command is outputted from said data shift command generating means, and video signal generating means for converting said shifted color data or said result color data outputted from said data shift means into a video signal.

* * * * *